United States Patent
Kedem

(10) Patent No.: US 9,703,784 B2
(45) Date of Patent: Jul. 11, 2017

(54) MOBILE DEVICE AND METHOD FOR CONCURRENTLY PROCESSING CONTENT ACCORDING TO MULTIPLE PLAYLISTS

(75) Inventor: Noam Kedem, Foster City, CA (US)

(73) Assignee: SanDisk IL LTD. (IL)

( * ) Notice: Subject to any disclaimer, the term of this patent is extended or adjusted under 35 U.S.C. 154(b) by 1980 days.

(21) Appl. No.: 11/963,931

(22) Filed: Dec. 24, 2007

(65) Prior Publication Data
US 2009/0164032 A1 Jun. 25, 2009

(51) Int. Cl.
*G06F 17/30* (2006.01)
*G06F 3/16* (2006.01)

(52) U.S. Cl.
CPC ........ *G06F 17/30056* (2013.01); *G06F 3/162* (2013.01)

(58) Field of Classification Search
CPC ....................................................... G06F 3/162
USPC ............................................................ 707/796
See application file for complete search history.

(56) References Cited

U.S. PATENT DOCUMENTS

| | | | | |
|---|---|---|---|---|
| 5,384,890 A | * | 1/1995 | Anderson et al. | ............ 704/200 |
| 5,574,862 A | * | 11/1996 | Marianetti, II | ........ G06F 15/167 710/100 |
| 5,574,905 A | * | 11/1996 | deCarmo | ............. G11B 27/034 |
| 5,765,166 A | * | 6/1998 | Gotfried | ................ G01S 13/726 342/190 |
| 5,802,358 A | * | 9/1998 | Konomi | .................. H04J 3/062 713/503 |
| 5,832,309 A | * | 11/1998 | Noe | ..................... G11B 27/002 710/61 |
| 6,088,785 A | * | 7/2000 | Hudson | ................. G06F 9/3879 712/35 |
| 6,252,920 B1 | * | 6/2001 | Hsu | .......................... G06F 3/162 375/377 |
| 6,356,639 B1 | * | 3/2002 | Ishito | ...................... G10L 21/04 348/E5.123 |
| 6,651,074 B1 | * | 11/2003 | Taylor | ................. G06F 11/1456 707/704 |

(Continued)

FOREIGN PATENT DOCUMENTS

| | | |
|---|---|---|
| CN | 1399205 | 2/2003 |
| WO | WO2005/086624 | 9/2005 |

OTHER PUBLICATIONS

Office Action for ROC (Taiwan) Patent Application No. 096151514 (Jan. 10, 2012).

(Continued)

*Primary Examiner* — Eliyah S Harper
(74) *Attorney, Agent, or Firm* — Stoel Rives LLP

(57) ABSTRACT

A mobile device, such as a media player, a telephone, or a gaming console, concurrently produces multiple content streams based on differing playlists. The mobile device includes a memory, a controller, and at least two output interfaces. The controller processes concurrently the content stored in the memory to produce a first content stream according to a first playlist and a second content stream according to a second playlist. More content streams may be produced based on additional playlist, all of which playlist differ from each other. The content streams may include audio content, video content, or a combination thereof. For each content stream, an output interface is available to convey the content stream. Also disclosed is a method of processing content to produce and send content streams to output interfaces.

18 Claims, 5 Drawing Sheets

(56) References Cited

U.S. PATENT DOCUMENTS

| | | | | |
|---|---|---|---|---|
| 6,832,306 | B1* | 12/2004 | Ganapathy | G06F 7/5443 712/35 |
| 7,137,126 | B1* | 11/2006 | Coffman | G06F 17/30899 704/200 |
| 7,233,166 | B2* | 6/2007 | Kanapathippillai | G06F 1/3203 326/31 |
| 7,472,067 | B2* | 12/2008 | Mathur | G06F 9/4843 704/270 |
| 7,596,180 | B2* | 9/2009 | Sullivan | H04N 21/25808 375/240.25 |
| 7,634,011 | B2* | 12/2009 | Sullivan | H04N 21/25808 375/240.25 |
| 7,649,943 | B2* | 1/2010 | Speed | H04N 21/25808 375/240.16 |
| 7,668,242 | B2* | 2/2010 | Sullivan | H04N 21/25808 375/240.25 |
| 8,041,848 | B2* | 10/2011 | Conroy | G06F 1/3203 710/22 |
| 8,354,995 | B2* | 1/2013 | Robinson | G06F 15/0283 345/156 |
| 8,494,127 | B2* | 7/2013 | Ittycheriah | G06F 9/505 379/88.18 |
| 2004/0117442 | A1 | 6/2004 | Thielen | |
| 2006/0242106 | A1* | 10/2006 | Bank | 707/1 |

OTHER PUBLICATIONS

AtomixMP3 The Ultimate DJ Mix Software pp. 1-5 copyright 2001 Atomix Productions.

Mediate Features Mediate Product Features from@homemedia Copyright 2007@ home media limited. All rights reserved.

AtomixMP3 The Ultimate DJ Mix SoftwareForum: Wishes and New Features—Topic: Duel Play List pp. 1-4 Copyright 2001 Atomix Productions.

Mediate Features mediate Product features from@homemedia pp. 1-4 Copyright 2007@ home media limited. All rights reserved.

SWE4 Swift Elite 4 The Fourth Edition of the first All-in-one Video,Audio,Karoke,and Lighting Solution—Now Vista Ready.

Communication of European publication No. and information on the application of Article 67(3) EPC for European Application No. 07849638.7 (Aug. 11, 2010).

Notification of Transmittal of the International Search Report and the Written Opinion of the International Searching Authority, or the Declaration for International Application No. PCT/IL2007/001612 (Jun. 11, 2008).

* cited by examiner

MOBILE DEVICE AND METHOD FOR CONCURRENTLY PROCESSING CONTENT ACCORDING TO MULTIPLE PLAYLISTS

BACKGROUND

Mobile devices enable a user to process contents stored in a memory to produce a content stream according to a playlist. One example of such a mobile device is a media player, which provides music via earphones to a single user. Other examples of mobile devices include telephones and mobile gaming consoles.

If multiple users want to listen to the music of a mobile device that is a media player, either more earphones must be connected to the media player, or the earphones need to be replaced with at least one speaker. In such an arrangement, all users are constrained to listen to the same music.

With the current state of the art, multiple users cannot have simultaneous access to different playlists on the same media player device. If multiple users share the same media player device they are limited to also sharing the same playlist and thus having the same shared experience. Users wanting to simultaneously access different playlists would need to use a separate media player device for each playlist. This is because the media player processes a single playlist regardless of how many earphones or speakers are implemented in the system. The single playlist limitation is common to various mobile devices and is not necessarily unique to mobile devices that are media players.

It would be desirable that a media player could play different playlists at the same time. For example, such a media player would be useful for a family during air travel. The family would need to bring only one such media player with enough earphones for each interested member of the family, and each family member could simultaneously play music from a playlist that differs from the other playlists. It would also be desirable that other types of mobile devices could simultaneously play different playlists at the same time.

SUMMARY

A design approach based in part on the foregoing observations is provided to enable a mobile device to produce simultaneously multiple content streams based on differing playlists. To implement this design approach, various embodiments are possible, including a mobile device and a method of processing content.

In one embodiment, a mobile device is provided, which has a memory, a controller, and a first and second output interface. The memory may be a flash memory. The controller is adapted to process concurrently the content stored in the memory to produce a first content stream according to a first playlist and to produce a second content stream according to a second playlist, the second playlist differing from the first playlist and the first and second content streams including at least audio content. The first output interface is adapted to convey the first content stream, and the second output interface adapted to convey the second content stream. The first, the second, or both content streams may further include video content or a combination of audio and video content. The mobile device may be a media player, a telephone, or a mobile gaming console.

The controller of the mobile device may be further adapted to process concurrently the content stored in the memory to produce a third content stream according to a third playlist, which differs from the first and second playlists. The third content stream would include at least audio content. The mobile device would further comprise a third output interface adapted to convey the third content stream.

The controller of the mobile device may include a microprocessor configured for multi-threaded processing with more than one thread processing a content stream, or the controller may include multiple microprocessors each of which are configured for handling a single thread processing a content stream.

The first and second output interfaces of the mobile device may be wireless interfaces, or the first and second output interfaces may be wired interfaces.

In another embodiment, a method of processing content is provided, which includes: processing content stored in a memory to produce a first content stream according to a first playlist, the first content stream including at least audio content; concurrently processing the content to produce a second content stream according to a second playlist, the second playlist differing from the first playlist and the second content stream including at least audio content; sending the first content stream to a first output interface; and sending the second content stream to a second output interface. The first, the second, or both content streams may further include video content or a combination of audio and video content. The memory may be a flash memory. The method may also include converting the first and second content streams into wireless signals.

The method may further include concurrently processing the content to produce a third content stream according to a third playlist, which differs from the first and second playlists. The method would also include sending the third content stream to a third output interface.

In the method, the processing to produce the first content stream and the processing to produce the second content stream may be performed by a microprocessor that is configured for multi-threaded processing with more than one thread processing a content stream, or the processing to produce the first content stream and the processing to produce the second content stream may be performed by multiple microprocessors each of which are configured for handling a single thread processing a content stream.

These and other embodiments, features, aspects and advantages thereof will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the various embodiment and together with the description, serve to explain them in greater detail. Wherever convenient, the same reference numbers will be used throughout the drawings to refer to the same or like elements, wherein.

DETAILED DESCRIPTION

The claims below will be better understood by referring to the detailed description of the various embodiments. This description is not intended to limit the scope of claims but instead to explain the design principles and the various embodiments that implement them. Examples of the various embodiments include mobile device and a method of processing content.

Figure 1:
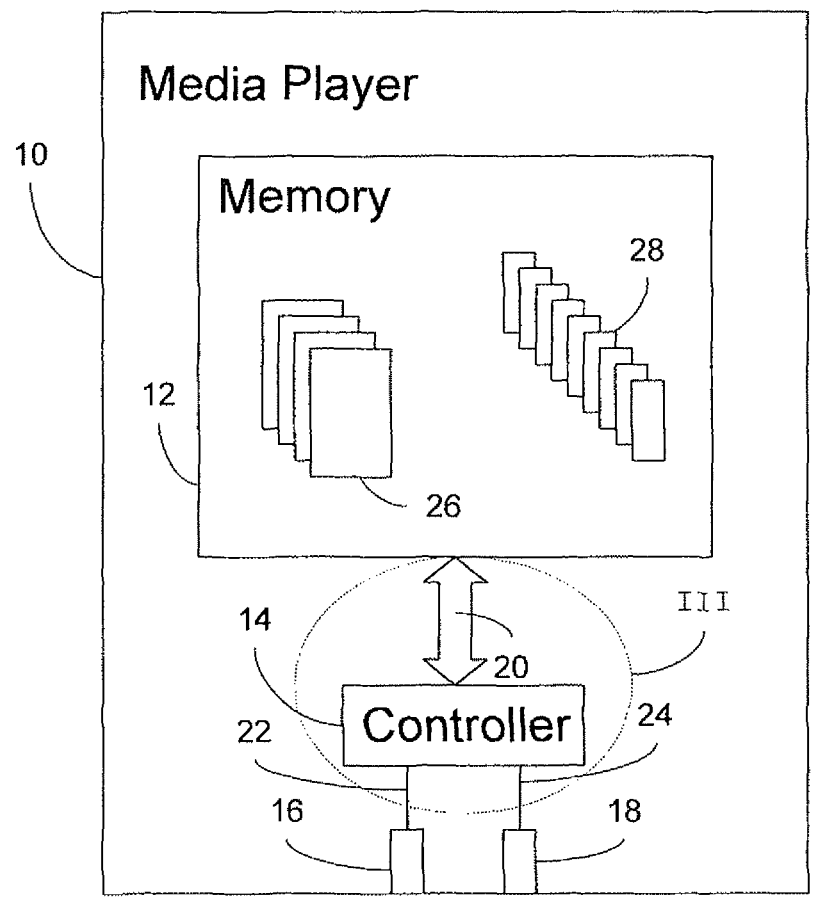
FIG. 1 illustrates an embodiment of a mobile device.

FIG. 1 illustrates one embodiment of a mobile device, which is a media player 10 having a memory 12, a controller 14, a first output interface 16, and a second output interface 18. The memory 12 may be a flash memory, examples of which are NAND flash memory and 3D flash memory. In this embodiment, the first and second output interfaces 16, 18 are earphone or speaker jacks. The controller 14 communicates with the memory 12 via a memory interface 20, which may be a NAND interface for a NAND memory. The controller 14 and the first and second output interfaces 16 and 18 communicate via leads 22 and 24, respectively.

The controller 14 receives content 26, which is stored in memory 12, through memory interface 20. The controller 14 is adapted to process concurrently content 26 to produce a first content stream according to a first playlist of the playlists 28 and to produce a second content stream according to a second playlist of the playlists 28. In this embodiment, the playlists 28 are stored in the memory 12. The referenced playlists differ from each other. In this embodiment, the first and second content streams are audio content streams, but in other embodiment the first, the second, or both content streams may further include video content or a combination of audio and video content.

The controller 14 sends the first content stream through lead 22 to the first output interface 16 and the second content stream through lead 24 to the second output interface 18. The first output interface 16 then conveys the first content stream to external earphones (not shown), and the second output interface 18 conveys the second content stream to another set of external earphones. The user has the option of replacing either set of earphones with speakers.

Figure 2:
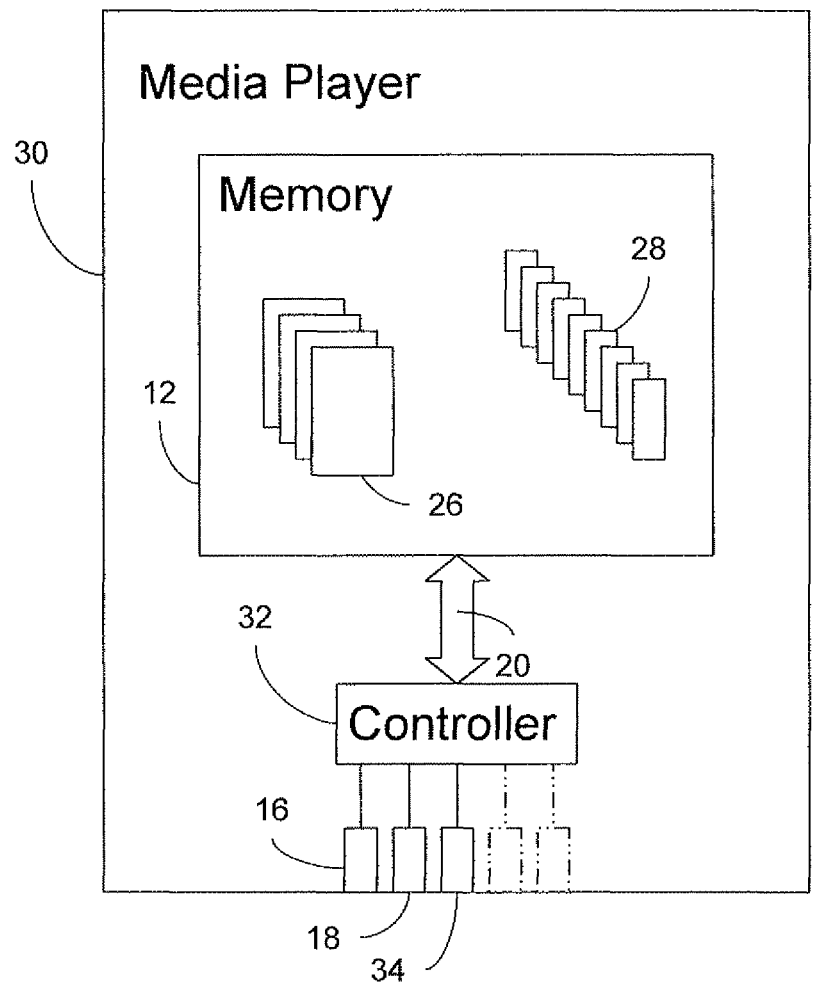
FIG. 2 illustrates an alternate embodiment of the mobile device of FIG. 1.

Various alternate embodiments are within the scope of the invention, and one example is the media player 30 illustrated in FIG. 2. As indicated by the same reference signs, the media player 30 includes many of the same elements as that of the media player 10 in FIG. 1. However, the media player 30 of FIG. 2 has a controller 32 that can process the content 26 stored in the memory 12 to produce a third content stream according to a third playlist of the playlists 28. The first, second, and third playlist each differ from each other. The third content stream is an audio content stream, but in other embodiment the third content stream may further include video content or a combination of audio and video content. The media player 30 also has a lead (not labeled in FIG. 2 for clarity) operatively connecting the controller 32 to a third output interface 34, which can convey the third content stream flowing through the lead from the controller. Additional embodiments within the scope of the invention have controllers that process content according to additional playlists and send the resulting content streams to additional output interfaces, as represented in phantom in FIG. 2.

Figure 3:
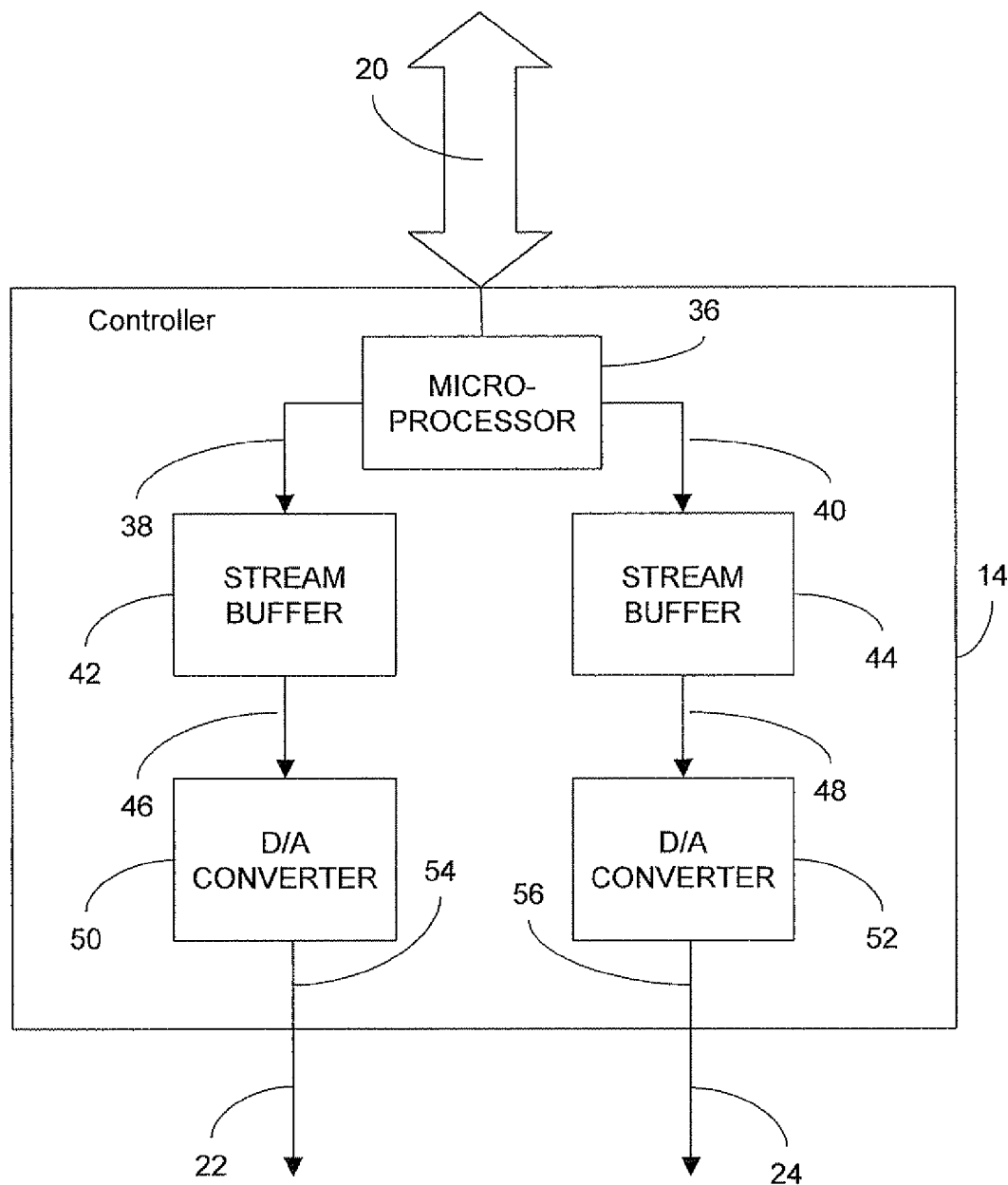
FIG. 3 provides a more in depth illustration of the subject matter bounded by the dashed circle III in FIG. 1.

Reference is now made to FIG. 3 to describe additional features of the controller 14. The figure illustrates the subject matter bounded by the dashed circle III in FIG. 1. As represented in FIG. 3, the controller 14 contains a microprocessor 36, which is configured for multi-threaded processing. The microprocessor 36 is capable of receiving encoded digital media data associated with two playlists and processing the data fast enough to feed two separate audio channels essentially simultaneously, as explained next. The microprocessor 36 can also be configured to perform digital rights management (DRM) validation, if desired.

The microprocessor 36 obtains digital content through the memory interface 20 and processes it by decoding the content associated with the first and second playlists and sending the decoded content through first and second direct memory access (DMA) channels 38 and 40 to first and second stream buffers 42 and 44, respectively. Although the processing is fast enough so that the two human users of the media player 10 can regard the processing of both playlists as "simultaneous," the microprocessor 36 in actuality quickly alternates between processing the separate streams for each of the channels 38 and 40 and keeps enough processed content in each of the stream buffers 42 and 44 to effectively provide simultaneous experiences to both users.

The decoded digital content flows from the stream buffers 42 and 44 through channels 46 and 48 to digital/analog (D/A) converters 50 and 52, respectively. The content is converted to analog data and output through channels 54 and 56 to leads 22 and 24, respectively.

Figure 4:
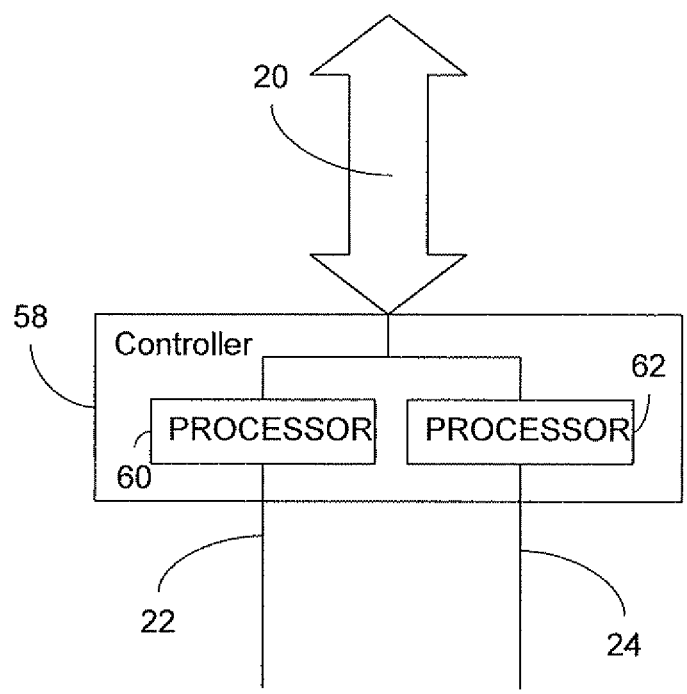
FIG. 4 provides an illustration of the subject matter of alternate embodiment of the subject matter illustrated in FIG. 3.

Although the controller 14 implements the microprocessor 36, which is configured for multithreaded processing with more than one thread processing a content stream, alternatives to the controller 14 are within the scope of the invention. For example, the controller 14 may be replaced with the controller 58, represented logically in FIG. 4, which includes multiple microprocessors 60 and 62, each of which being configured for handling a single thread processing a content stream.

Additional alternative embodiments are within the scope of the invention. For example, although in the first embodiment the first and second output interfaces 16, 18 are wired interfaces (earphone/speaker jacks), the first and second output interfaces 16, 18 may be replaced with wireless interfaces. An example of such a wireless interface is a Bluetooth interface for transmitting to Bluetooth headsets.

The invention is also not limited to mobile devices that are media player. Other mobile devices embodying the invention include telephone and mobile gaming consoles.

Figure 5:
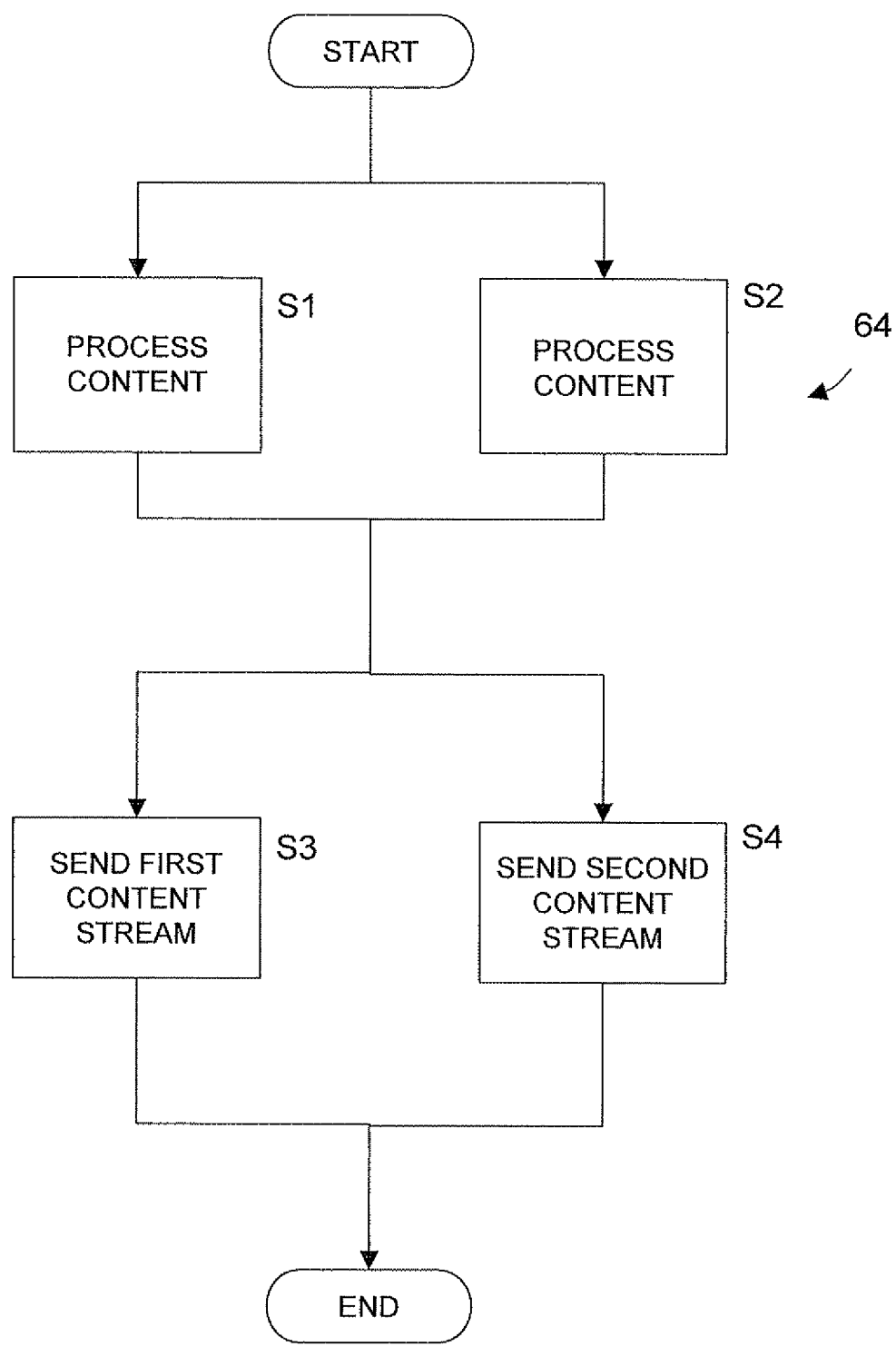
FIG. 5 provides flow chart representing a method of processing content.

Another embodiment is a method of processing content. FIG. 5 provides a flow chart 64 representing basic steps of the method.

The first two steps of the method can be executed substantially concurrently. One step is processing content stored in a memory to produce a first content stream according to a first playlist. [Step S1.] The other step is processing the content to produce a second content stream according to a second playlist. [Step S2.] The first and second playlists implemented differ from each other.

However, Steps S1 and S2 do not need to begin and/or end at the same time. Instead, it is sufficient that at least a portion of the execution periods overlap. That is, a portion of the execution periods are "concurrent."

The processing in steps S1 and S2 may be performed by a microprocessor that is configured for multi-threaded processing with more than one thread processing a content stream. Alternatively, the processing may be performed by multiple microprocessors, each of which being configured for handling a single thread processing a content stream.

The next two steps of the method are also executed concurrently. One of these steps is sending the first content stream to a first output interface. [Step S3.] The other step is sending the second content stream to a second output interface. [Step S4.] As a result, two differing content streams are concurrently provided from the same memory.

In this method, the first and second content streams produced are audio content streams. However, in alternate embodiments, the first, second, or both content streams may farther include video content or a combination of audio and video content.

The method may be applied to content stored in a flash memory. Examples of such memory include NAND flash and 3D flash memories.

Alternate embodiments of the embodiment represented by flow chart 64 in FIG. 5 may include additional concurrently executed steps. For example, using a playlist that differs from both the first and second playlist, the content stored in memory may be processed to produce a third content stream while the first and second content streams are being produced. Also, the third content stream may be sent to a third output interface at the same time that the first and second content streams are sent to the first and second output interfaces, respectfully. Conceptually, there is no limit to the number of differing content streams that can be concurrently provided, and maximum number is based instead on the physical limitations of the components implemented.

The method may also include converting the first and second content streams into wireless signals. For example, the first and second content streams may be converted into Bluetooth format, and the method would include transmitting the content stream to Bluetooth headsets.

Having thus described the foregoing exemplary embodiments it will be apparent to those skilled in the art that various equivalents, alterations, modifications, and improvements thereof are possible without departing from the scope and spirit of the claims as hereafter recited. Accordingly, the claims are not limited to the foregoing discussion.

I claim:

1. A mobile device comprising:
    a memory located within the mobile device for storing content;
    a controller located within the mobile device adapted to process concurrently the content stored in the memory to produce a first content stream according to a first playlist and to produce a second content stream according to a second playlist, the second playlist differing from the first playlist and the first and second content streams including at least audio content, wherein the first content stream is distinct from the second content stream and wherein the controller includes:
        a microprocessor that alternatingly and respectively outputs the first and second content streams to first and second direct memory access (DMA) channels;
        first and second stream buffers for respectively receiving the content streams from the first and second DMA channels; and
        first and second digital to analog (D/A) converters for respectively outputting the first and second content streams;
    a first output interface of the mobile device adapted to receive the first content stream from the first D/A converter and to convey the first content stream; and
    a second output interface of the mobile device distinct from the first output interface and adapted to receive the second content stream from the second D/A converter and to convey the second content stream simultaneously with the conveyance of the first content stream, wherein the first and second output interfaces each comprise a speaker or headphone interface for respectively and simultaneously playing the first and second content streams to one or more users via speakers or headphones connected to the speaker or headphone interfaces.

2. The mobile device of claim 1, wherein the controller is further adapted to process concurrently the content stored in the memory to produce a third content stream according to a third playlist, which differs from the first and second playlists, and the third content stream including at least audio content, the mobile device further comprising:
    a third output interface adapted to convey the third content stream.

3. The mobile device of claim 1, wherein the first, the second, or both content streams further include video content or a combination of audio and video content.

4. The mobile device of claim 1, wherein the controller includes a microprocessor configured for multi-threaded processing with more than one thread processing a content stream.

5. The mobile device of claim 1, wherein the controller includes multiple microprocessors each of which being configured for handling a single thread processing a content stream.

6. The mobile device of claim 1, wherein the memory is a flash memory.

7. The mobile device of claim 1, wherein the first and second output interfaces are wireless interfaces.

8. The mobile device of claim 1, wherein the first and second output interfaces are wired interfaces.

9. The mobile device of claim 1, wherein the mobile device is a media player.

10. The mobile device of claim 1, wherein the mobile device is a telephone.

11. The mobile device of claim 1, wherein the mobile device is a mobile gaming console.

12. A method of processing content, the method comprising:
    processing, using a controller of a mobile device, content stored in a memory of the mobile device to produce a first content stream according to a first playlist, the first content stream including at least audio content;
    concurrently processing, using the controller of the mobile device, the content to produce a second content stream according to a second playlist, the second playlist differing from the first playlist and the second content stream including at least audio content, wherein the first content stream is distinct from the second content stream;
    using a microprocessor of the controller of the mobile device, alternatingly and respectively outputting the first and second content streams to first and second direct memory access (DMA) channels and from the first and second DMA channels to first and second stream buffers;
    respectively outputting the first and second content streams from the first and second stream buffers to first and second digital to analog (D/A) converters;
    sending, from the first D/A converter, the first content stream to a first output interface of the mobile device; and
    sending, from the second D/A converter, the second content stream to a second output interface of the mobile device, wherein the second output interface is distinct from the first output interface and is adapted to convey the second content stream simultaneously with the conveyance of the first content stream by the first output interface, wherein the first and second output interfaces each comprise a speaker or headphone interface for respectively and simultaneously playing the first and second content streams to one or more users via speakers or headphones connected to the speaker or headphone interfaces.

13. The method of claim 12 further comprising:
concurrently processing the content to produce a third content stream according to a third playlist, which differs from the first and second playlists; and
sending the third content stream to a third output interface.

14. The method of claim 12, wherein the first, the second, or both content streams further include video content or a combination of audio and video content.

15. The method of claim 12, wherein the processing to produce the first content stream and the processing to produce the second content stream are performed by a microprocessor that is configured for multi-threaded processing with more than one thread processing a content stream.

16. The method of claim 12, wherein the processing to produce the first content stream and the processing to produce the second content stream are performed by multiple microprocessors each of which being configured for handling a single thread processing a content stream.

17. The method of claim 12, wherein the memory is a flash memory.

18. The method of claim 12 further comprising:
converting the first and second content streams into wireless signals.

* * * * *